United States Patent
Tatehana et al.

(10) Patent No.: US 6,618,601 B1
(45) Date of Patent: Sep. 9, 2003

(54) INCOMING CALL INDICATOR FOR PORTABLE PHONE

(75) Inventors: Masami Tatehana, Kanagawa (JP); Tsutomu Abe, Kanagawa (JP); Shinichi Ootsuka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/610,254

(22) Filed: Jul. 5, 2000

(30) Foreign Application Priority Data

Jul. 9, 1999 (JP) ............................................ 11-196188

(51) Int. Cl.⁷ ................................................ H04B 1/38
(52) U.S. Cl. .................................. 455/567; 379/433.01
(58) Field of Search ................................ 455/567, 566, 455/575, 90; 379/433.01

(56) References Cited

U.S. PATENT DOCUMENTS

| | | | | |
|---|---|---|---|---|
| 5,896,453 A | * | 4/1999 | Speaks | 379/433.01 |
| 5,917,453 A | * | 6/1999 | Uchino et al. | 343/721 |
| 5,946,636 A | * | 8/1999 | Uyeno et al. | 455/566 |
| 6,130,646 A | * | 10/2000 | Jang | 343/721 |
| 6,215,984 B1 | * | 4/2001 | Figueras et al. | 455/90 |
| 6,438,391 B1 | * | 8/2002 | Wang | 455/566 |

FOREIGN PATENT DOCUMENTS

| | | | | |
|---|---|---|---|---|
| JP | 4-41643 | | 9/1992 | |
| JP | 4-121142 | | 10/1992 | |
| JP | 410262102 A | * | 9/1998 | |
| JP | 410262102 A | * | 9/1998 | |
| JP | 411136319 A | * | 5/1999 | ............ H04M/1/00 |
| JP | 411136756 A | * | 5/1999 | ............ H04Q/7/38 |
| JP | 2001168956 A | * | 6/2001 | ............ H04M/1/00 |

* cited by examiner

Primary Examiner—Charles Appiah
(74) Attorney, Agent, or Firm—Pearne & Gordon LLP

(57) ABSTRACT

A incoming call indicator has a configuration wherein a ring-like light transmissible member is disposed between an antenna main body and a portable phone main body at the base end part of the antenna main body, mounted projecting from the portable phone main body, and a light guiding member is provided in a hollow part of a fixing member for fixing the antenna main body, with the tip end part of the light guiding member disposed in a hollow part of the light transmissible member as well as with a light emitting element to be driven subject to an incoming call signal, provided facing to a light inputting part at the lower end part of the light guiding member.

5 Claims, 3 Drawing Sheets

INCOMING CALL INDICATOR FOR PORTABLE PHONE

BACKGROUND OF THE INVENTION

The present invention relates to an incoming call indicator for a portable phone, in particular, it relates to an incoming call indicator for a portable phone having an antenna attached to a phone main body, projecting therefrom.

Portable phones comprise an incoming call indicator for visually confirming an incoming call in addition to the advice by a call sound or vibration.

Conventional incoming call indicators have been provided originally either in the front surface or in the upper surface of a portable phone. Although the structure is simple, it also involves a problem in that the incoming call indicator can hardly be seen depending on the state of the portable phone in use. As an incoming call indicator for solving the problem, for example, those disclosed in JP-A-4-121142U and JP-B-4-41643U are known.

FIG. 4 shows an incoming call indicator according to the technique of JP-A-4-121142U, comprising an antenna 51 mounted on a phone main body 50, projecting therefrom, a light transmissible member 52 provided around the outer periphery of the base end part of the antenna 51, with the upper part of the light transmissible member 52 projecting from the phone main body 50 as well as the lower part 52a disposed inside the phone main body 50, a light introducing part 53 provided in the lower part 52a of the light transmissible member 52, and a light emitting element 54 disposed facing to the light introducing part 53. According to the configuration, since the light transmissible member 52 is disposed around the outer periphery of the base end part of the antenna 51, the entirety of the base end part of the antenna 51 can emit a light. Therefore, the user can observe the light emission from the light transmissible member 52 visually from anywhere as long as the phone main body 50 can be seen.

FIG. 5 shows an incoming call indicator according to the technique of JP-B-4-41643U, comprising a light transmissible member 63 mounted across the upper surface 61 and the front surface 62 of a phone main body 60. Therefore, the light emission from the light transmissible member 63 can be observed visually even in the case the phone main body 60 is placed on a desk or attached to a belt.

However, according to the incoming call indicator of JP-A-4-121142U, since the light transmissible member 52 is fitted around the outer periphery of the antenna 51, it is difficult in terms of the structure design.

In contrast, according to the incoming call indicator of JP-B-4-41643U, due to the limitation of the light transmissible member 63 shape, the light can be emitted only to the two directions, that is, to the upper surface 61 and the front surface 62. Therefore, depending on the state of use, the light emission from the light transmissible member 63 may not be observed visually. That is, the light emission visible range is narrow.

SUMMARY OF THE INVENTION

In view of the above-mentioned problems, an object of the invention is to provide an incoming call indicator for a portable phone with a simple configuration, having a wide light emission visible range for allowing preferable visible observation of the incoming call state.

In order to achieve the above-mentioned object, an incoming call indicator for a portable phone according to the invention comprises an antenna main body projecting from a portable phone main body, a light transmissible member disposed so as to be exposed circumferentially between the base end part of the antenna main body and the portable phone main body, a light guiding member disposed inside the portable phone main body, with a light outputting part provided on one end, facing to the light transmissible member, and a light emitting element disposed facing to a light inputting part provided on the other end of the light guiding member for emitting a light according to an incoming call signal.

Moreover, it is preferable that the light transmissible member comprises an elastic ring-like member having a sealing function for preventing entrance of water from the gap between the antenna main body and the portable phone main body.

Furthermore, it is preferable that the light transmissible member comprises an elastic member having an attachment loosening prevention function in the part with the antenna main body attached to the portable phone main body.

In the above-mentioned configuration, a light from the light emitting element is inputted to the light inputting part of the light guiding member so as to be guided to the other end and outputted to the outside from the light outputting part of the light guiding member via the light transmissible member. Since the light transmissible member is provided circumferentially between the base end part of the antenna main body and the portable phone main body, the outer periphery of the antenna base part emits a light at the time of incoming call according to an incoming call signal. Therefore, the user can easily recognize the light emission from the incoming call indicator visually from anywhere as long as the phone main body can be seen. Moreover, owing to the simple configuration of disposing the light transmissible member between the antenna main body and the portable phone main body and providing the light guiding member in the portable phone main body, the structure design and the assembly operation can be facilitated.

Furthermore, since the light transmissible member comprises a ring-like member having elasticity, such as rubber so as to serve as a sealing member, it can serve also as a rubber ring for providing the watertight structure in the antenna part, and thus increase of the number of components can be prevented. Moreover, since the light transmissible member comprises a member having elasticity, such as rubber, pressure and friction force can be added to the part with the antenna attached, and thus loosening of attachment of the antenna main body can be prevented.

DETAILED DESCRIPTION OF THE PREFERRED EMBODIMENTS

Hereinafter a preferable embodiment of an incoming call indicator for a portable phone according to the invention will be explained in detail with reference to the drawings.

Figure 1:
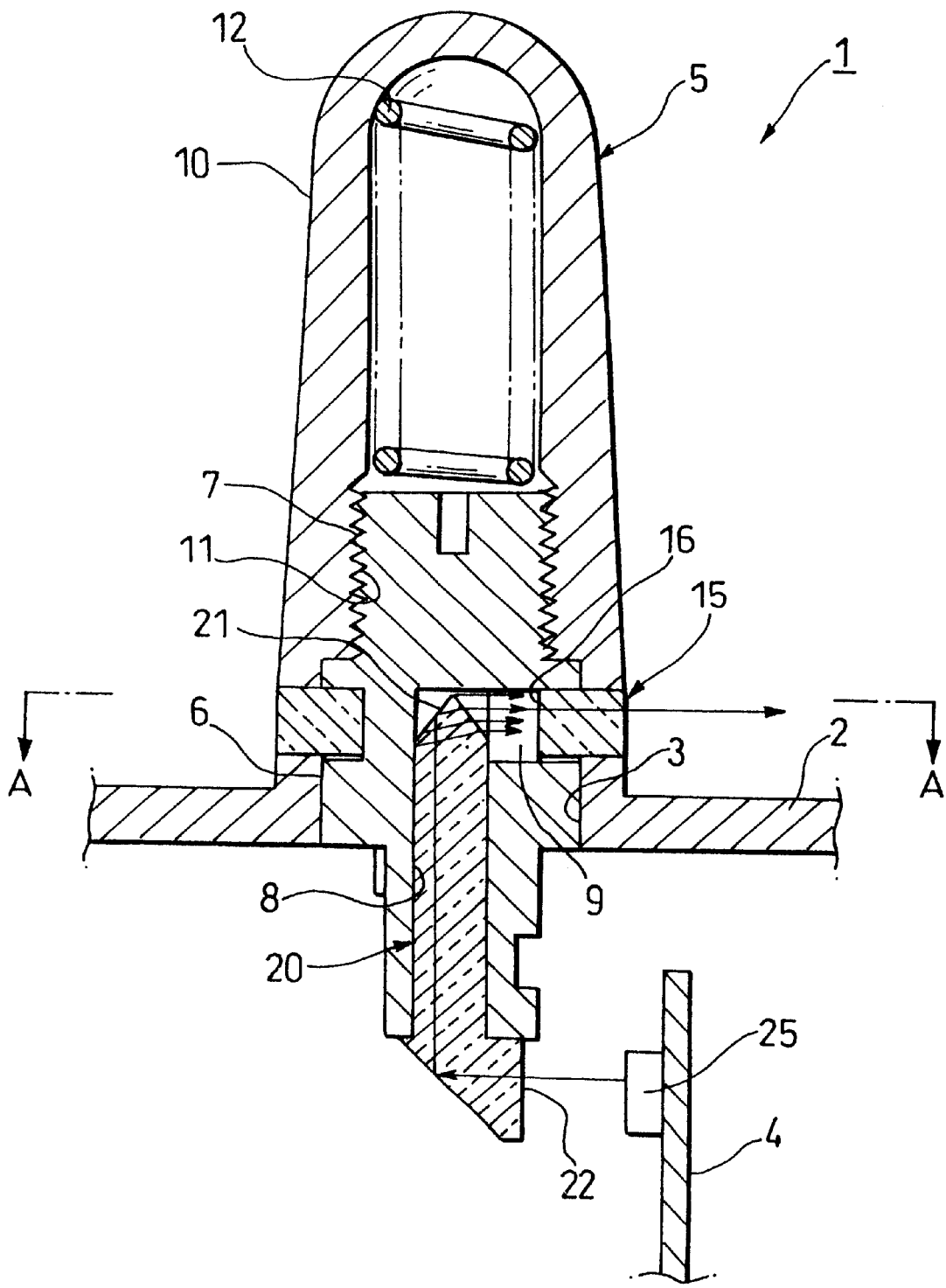
FIG. 1 is a cross-sectional view showing the configuration of an incoming call indicator for a portable phone according to an embodiment of the invention.
Figure 2:
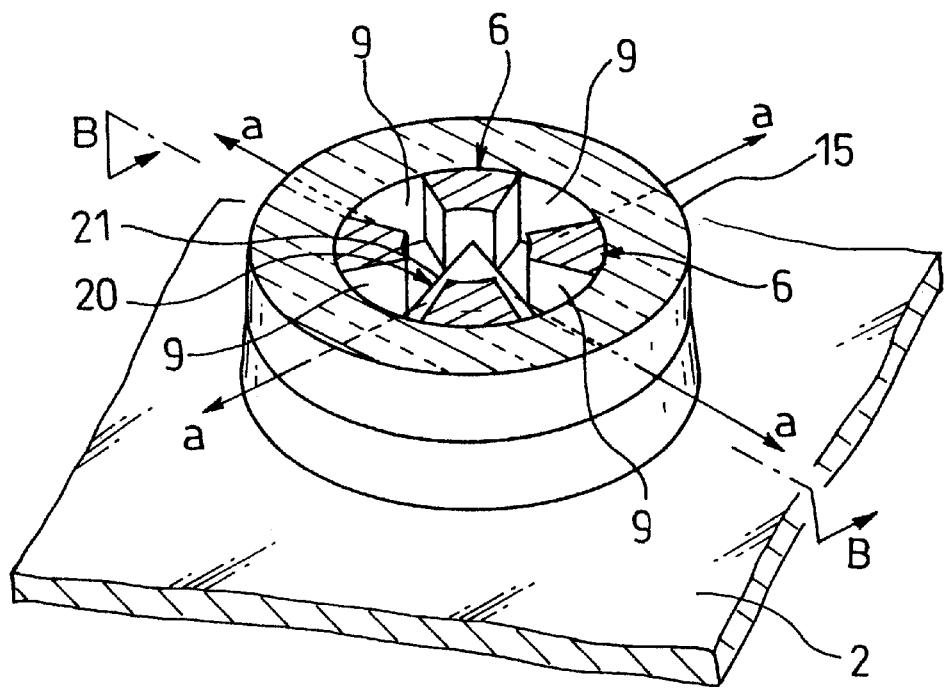
FIG. 2 is a principal part perspective view of the cross-section taken on the line A—A of FIG. 1, viewed obliquely.
Figure 3:
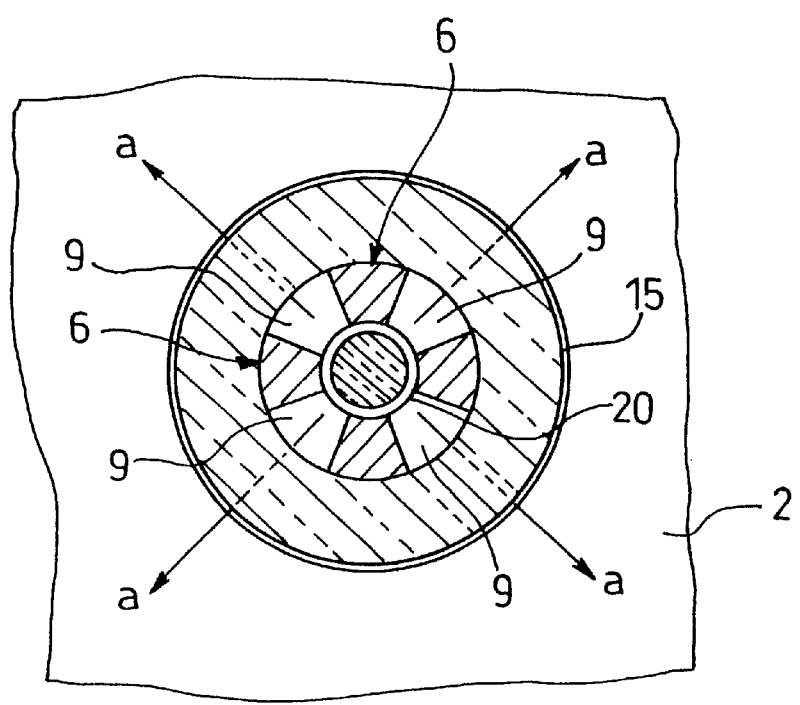
FIG. 3 is a cross-sectional view taken on the line B—B of FIG. 2.
Figure 4:
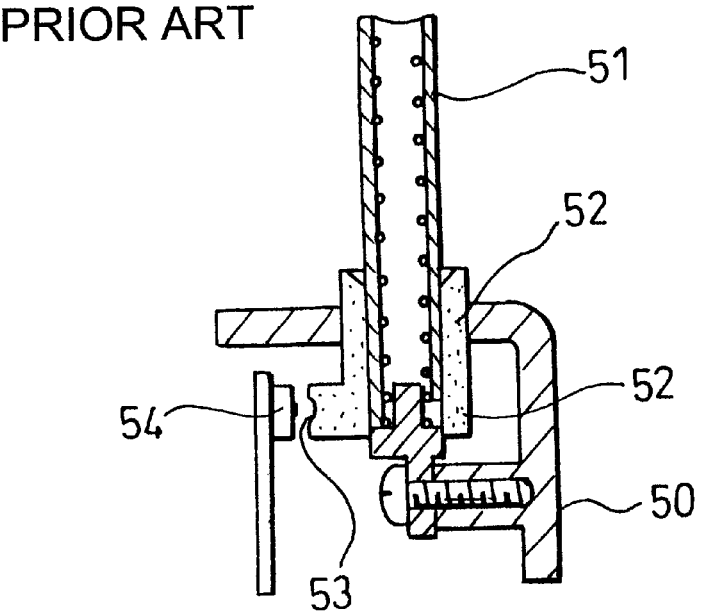
FIG. 4 is a cross-sectional view showing a conventional incoming call indicator for a portable phone.
Figure 5:
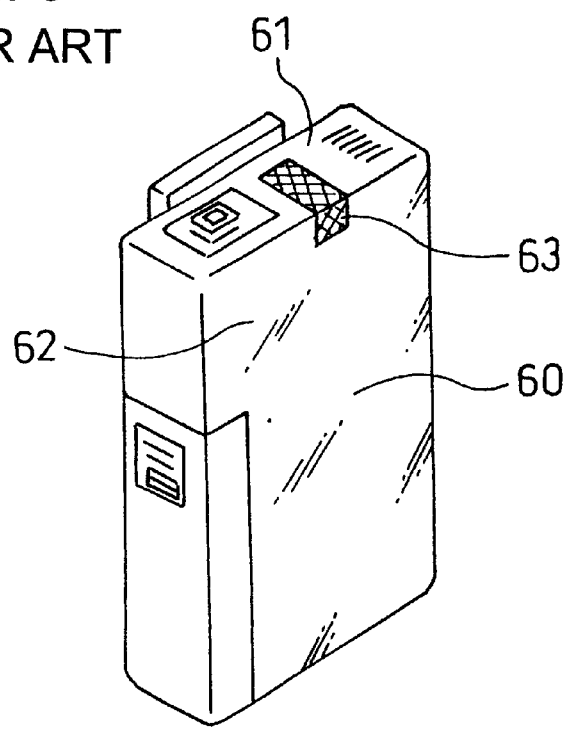
FIG. 5 is a perspective view showing a portable phone comprising another conventional incoming call indicator for a portable phone.

FIG. 1 is a cross-sectional view showing the configuration of an incoming call indicator for a portable phone according to an embodiment of the invention. FIG. 2 is a principal part perspective view of the cross-section taken on the line A—A of FIG. 1, viewed from obliquely above. FIG. 3 is a cross-sectional view taken on the line B—B of FIG. 2.

A incoming call indicator 1 for a portable phone according to this embodiment can be provided, for example, at the antenna installing part in the upper part of the portable phone. A substantially columnar hollow antenna main body 5 is mounted on a portable phone main body 2, projecting therefrom. A coil-like antenna 12 is stored inside the antenna main body 5. A fixing member 6 is provided inside the antenna main body 5 at the base end side for fixing by screwing the antenna main body 5 in the state engaged with the portable phone main body 2. A ring-like light transmissible member 15 is disposed between the base end part of the antenna main body 5 and the portable phone main body 2. A hollow part 8 is provided inside the fixing member 6, with a light guiding member 20 inserted through the hollow part 8. The light guiding member 20 comprises a tapered tip end part 21 corresponding to a light outputting part, disposed in a hollow part 16 of the light transmissible member 15, and a light inputting part 22 formed in the lower end part. A light emitting element 25 is provided inside the portable phone main body 2, facing to the light inputting part 22 at the lower end part of the light guiding member 20, and is fixed to a mounting member 4.

That is, the incoming call indicator 1 has a configuration wherein the ring-like light transmissible member 15 is disposed between the antenna main body 5 and the portable phone main body 2 at the base end part of the antenna main body 5, mounted projecting from the portable phone main body 2, and the light guiding member 20 is provided in the hollow part 8 of the fixing member 6 for fixing the antenna main body 5, with the tip end part 21 of the light guiding member 20 disposed in the hollow part 16 of the light transmissible member 15 as well as with the light emitting element 25 to be driven subject to an incoming call signal, provided facing to the light inputting part 22 at the lower end part of the light guiding member 20.

In assembling the incoming call indicator 1, the antenna main body 5 is fixed to the portable phone main body 2 by engaging a fringe part provided in the outer periphery of the fixing member 6 into the opening 3 of the portable phone main body 2 so that the upper part of the fixing member 6 projects from the opening 3, and screwing a male screw 7 of the fixing member 6 into a female screw 11 of an antenna exterior 10. Moreover, the light guiding member 20 is inserted into the hollow part 8 of the fixing member 6 so that the tip end part 21 of the light guiding member 20 with a tapered shape, such as a conical shape, is disposed in the hollow part 16 of the light transmissible member 15. Furthermore, the light emitting element 25 is disposed facing to the light inputting part 22 at the lower end part of the light guiding member 20.

The light transmissible member 15 preferably made of a rubber ring-like member capable of transmitting a visible ray. According to the configuration, the light transmissible member 15 provides a function of transmitting the emitted light for incoming call display, a function as a sealing member of preventing entrance of water from the gap between the portable phone main body 2 and the antenna main body 5 to the inside, and a function of preventing attachment loosening of the antenna main body 5 after attaching the antenna main body 5 to the portable phone main body 2.

As shown in FIGS. 2 and 3, the fixing member 6 has a cross-shaped notch part 9 for communicating the outer peripheral part and the inner hollow part 8 at the upper part of the hollow part 8 (shown in FIG. 1). Accordingly, a light from the light emitting member 25 guided by the light guiding member 20 to the tip end part 21 can be guided to the light transmissible member 15 through the notch part 9 as shown by the arrow a so as to be outputted from the outer periphery of the light transmissible member 15.

Operation of the incoming call indicator 1 for a portable phone according to this embodiment will be explained.

When an incoming call signal is inputted in the light emitting element 25 subject to an incoming call in the portable phone, the light emitting element 25 is driven according to the incoming call signal so as to emit a light by flickering (or lighting). The light from the light emitting element 25 is inputted in the light inputting part 22 of the light guiding member 20 so as to be transmitted to the tip end part 21. Then, the light is outputted from the tip end part 21 of the light guiding member 20 so as to reach to the light transmissible member 15 through the notch part 9 of the fixing member 6.

The light guided to the light transmissible member 15 transmits through the light transmissible member 15 so as to be outputted from the outer periphery so that the base end part outer periphery of the antenna main body 5 emits a light accordingly. As a result, the light emission visible range can be provided in the entire peripheral direction of the antenna main body 5 so that the user can easily recognize the light emission from the incoming call indicator 1 visually from anywhere as long as the phone main body 2 can be seen.

Although the notch part 9 of the fixing member 6 is formed in a cross shape in this embodiment in consideration of the mechanical strength of the antenna part, in the case the visibility of the user is regarded as important, it is preferable to provide the notch part 9 in many directions, such as in 8 directions or in 12 directions.

As mentioned above, since this embodiment has a simple configuration wherein the light guiding member is mounted in the hollow part of the antenna main body as well as the light transmissible member is disposed between the antenna main body and the portable phone main body, difficulty in terms of the structure design can be eliminated, and thus the incoming call indicator can be formed easily. As a result, cost rise of the portable phone can be prevented. Moreover, since a light can be emitted from the outer periphery of the antenna base part owing to the light transmissible member, a wide light emission visible range can be obtained around the entire periphery of the antenna main body. As a result, the user can easily recognize the light emission from the incoming call indicator visually from anywhere as long as the phone main body can be seen, and thus the convenience of the portable phone can be improved.

Furthermore, since the light transmissible member comprises a rubber ring-like member, it can serve also as a rubber ring for providing a watertight structure, an incoming call indicator having a wide light emission visible range can be provided without increase of the number of components. Moreover, since the pressure and the friction force can be added to the part with the antenna attached owing to the rubber light transmissible member so as to provide the attachment loosening prevention function for the antenna main body, problems such as fall-off of the antenna can be prevented.

As heretofore described, according to an incoming call indicator for a portable phone according to the invention, since a ring-like light transmissible member is disposed between an antenna main body and a portable phone main body at the base end part of the antenna main body, mounted projecting from the portable phone main body, and a light guiding member is provided inside the portable phone main body, with a light outputting part provided on one end of the light guiding member disposed facing to the light transmissible member as well as with a light emitting element for emitting a light subject to an incoming call signal provided on the other end of the light guiding member, disposed facing to a light inputting part, an incoming call indicator with a simple configuration, having a wide light emission visible range.

What is claimed is:

1. An incoming call indicator for a portable phone comprising:

an antenna main body projecting from a main body of the portable phone;

a light transmissible member disposed between a base end part of said antenna main body and the main body of the portable phone so as to be exposed circumferentially;

a light guiding member disposed inside the main body of the portable phone, with a light outputting part provided on one end, facing to the light transmissible member; and a light emitting element disposed facing to a light inputting part provided on the other end of the light guiding member for emitting a light according to a receipt signal.

2. The incoming call indicator for a portable phone according to claim 1, wherein said light transmissible member comprises an elastic ring-like member having a sealing function for preventing entrance of water from the gap between the antenna main body and the portable phone main body.

3. The incoming call indicator for a portable phone according to claim 1, wherein the light transmissible member comprises an elastic member having an attachment loosening prevention function in the part with the antenna main body attached to the portable phone main body.

4. The incoming call indicator for a portable phone according to claim 1, wherein said antenna main body comprises a fixing member having a hollow part in which said light guiding member being inserted.

5. The incoming call indicator for a portable phone according to claim 4, wherein said fixing member has a notch part for communicating an outer peripheral part of said light guiding member and an inner side of said light transmissible member.

* * * * *

UNITED STATES PATENT AND TRADEMARK OFFICE
CERTIFICATE OF CORRECTION

PATENT NO.    : 6,618,601 B1
DATED         : September 9, 2003
INVENTOR(S)   : Masami Tatehana et al.

It is certified that error appears in the above-identified patent and that said Letters Patent is hereby corrected as shown below:

<u>Title page,</u>
Item [*] Notice, please delete the notice as it appears, and insert the following therefor:
-- Subject to any disclaimer, the term of this patent is extended or adjusted under 35 U.S.C. 154(b) by 474 days. --

<u>Column 6,</u>
Lines 3-4, please delete "a receipt signal", and insert therefor
-- an incoming call signal --.

Signed and Sealed this

Twenty-seventh Day of January, 2004

JON W. DUDAS
*Acting Director of the United States Patent and Trademark Office*